United States Patent [19]
LaLone et al.

[11] Patent Number: 5,478,142
[45] Date of Patent: Dec. 26, 1995

[54] SINGLE SIDED CONTROL VALVE AND PIPE BRACKET ARRANGEMENT

[75] Inventors: Luann M. LaLone, Adams; Robert Gayfer, Watertown, both of N.Y.

[73] Assignee: New York Air Brake Corporation, Watertown, N.Y.

[21] Appl. No.: 280,534

[22] Filed: Jul. 26, 1994

[51] Int. Cl.[6] ................................................. B60T 15/52
[52] U.S. Cl. ............................ 303/36; 303/74; 137/354; 251/143
[58] Field of Search ............................ 303/35–39, 69, 303/74; 137/899, 351, 354; 251/143

[56] References Cited

U.S. PATENT DOCUMENTS

| | | | |
|---|---|---|---|
| 1,192,960 | 8/1916 | Turner | 303/36 |
| 1,502,521 | 10/1923 | Neal | 303/27 |
| 1,879,669 | 11/1930 | Farmer et al. | 303/35 |
| 1,910,544 | 8/1931 | Hewitt | 303/35 |
| 4,033,632 | 7/1977 | Wilson | 303/74 |
| 4,052,110 | 10/1977 | Banker | 303/36 |
| 4,058,348 | 11/1977 | Hart | 303/35 |
| 4,067,624 | 1/1978 | McEathron | 303/69 |
| 4,076,322 | 2/1978 | Banker et al. | 303/1 |
| 4,125,292 | 11/1978 | Worbois et al. | 303/36 |
| 4,127,308 | 11/1978 | McEathron | 303/35 |
| 4,775,194 | 10/1988 | Vaughn et al. | 303/74 |

Primary Examiner—Robert J. Oberleitner
Assistant Examiner—Peter M. Poon
Attorney, Agent, or Firm—Barnes & Thornburg

[57] ABSTRACT

A single sided control valve wherein the service portion is mounted to the front face of a pipe bracket adjacent to the right face and the emergency portion is mounted to the front face adjacent to the left face. The brake pipe, brake cylinder and at least one reservoir port are on the back face and the brake pipe port is adjacent to the left face behind the emergency portion. Mounting brackets each include a horizontal flange with apertures to receive the fasteners which mount the mounting brackets to the vehicle and the horizontal flange which extends from the pipe bracket substantially past the front face and the center of gravity of the control valve. A combined dirt collector and cut-off cock is connected to the brake pipe port adjacent to the left face of the pipe bracket and includes a handle to the left of the left face.

19 Claims, 3 Drawing Sheets

SINGLE SIDED CONTROL VALVE AND PIPE BRACKET ARRANGEMENT

BACKGROUND AND SUMMARY OF THE INVENTION

The present invention relates generally to brake control valves for the air brakes of a vehicle, and more specifically to a single sided brake control valve. Air brake control valves used in the railroad industry have generally included a center pipe bracket with a serve portion on the right side, and an emergency portion on the left side. The connections of the ports for the brake cylinder, brake pipe and reservoirs are in the back of the pipe bracket. The pipe bracket is mounted to the vehicle through vertical apertures in the pipe bracket. Typical examples are the ABD series and the DB-60.

More recently, there has been interest in a single sided brake control valve where in the emergency and service portions are mounted to a front face of the pipe bracket and the ports are on the back face. Early single sided control valves are shown in U.S. Pat. No. 1,192,960 and 1,502,521. The emergency and service portions are mounted to the top face of the bracket and the porting is on the bottom face. Later developments turned away from this technology and included a service and emergency portion mounted to common side face with the ports mounted to the bottom face. A typical example is shown in U.S. Pat. Nos. 1,879,699; 1,910,544; 4,033,632; and 4,125,292. The mounting of a combined service and emergency portion to the left face and the porting to the right face of a pipe bracket is illustrated in U.S. Pat. No. 4,058,348. Although many ideas have been patented, not all of the them have been implemented or even accepted by the industry.

An early design by New York Air Brake Corporation, the Assignee of the subject application, is illustrated in Design Patent Application Ser. No. 29/012,476 filed Sep. 3, 1993, and shows a single sided control valve and pipe bracket having the service portion mounted to the adjacent left side of the front face and the emergency portion mounted adjacent to the right side of the front face. The brake pipe, brake cylinder and reservoir ports are on the back face with the brake pipe port substantially in the center, but closer to the right face. The manual release valve of the service portion extends to the left of the left face. A retaining valve is mounted to the bottom center of the front face between the service and emergency valve and adjacent to the handle of the cut-off cock mounted to the brake pipe port. The air filter is in the pipe bracket behind the service portion as required by a AAR Field Manual Rule 4, Item 4.

A similar valve was designed by Westinghouse Air Brake Corporation with the exception that the air filter is behind the emergency section contrary to the Field Manual Rule 4, Item 4. This leads to a lot of confusion in the field maintenance and results in the filter not being changed when they should be. Similarly, the Wabco design, which is illustrated in FIG. 1, uses vertical throughbolts to mount to the pipe bracket to mounting brackets, the mounting brackets are flushed to the front wall of the pipe bracket and extends past the back wall. This places the service and emergency portion in a cantilever relationship to the mounting bracket. This is an undesirable situation.

In both the New York Air Brake and the Wabco single sided design, the handle of the combined dirt collector and cut-out cock is inaccessible since it is on the back side of the pipe bracket with the handle accessible in one position from underneath the bottom wall. Closing the cock requires the operator to angle their arm under the pipe bracket and pull the handle forward into a horizontal position further bending and straining their arm. Excessive gasket changing and bolt cleaning is very awkward due to the cramp area of the location of the bolt. The manual release valve is historically on the left side of the service portion. By providing the service portion on the front face adjacent to the left side of the bracket, the release rod is closer to the front end of the car, which is to the left of the example used herein. In short platform cars or cars which have a slope sheet containers, for example, coal cars, a requirement that the release rod be 30 inches from the end of the car may not or cannot be met.

Thus, there exists the need for an improved single sided pipe bracket which is more user friendly and capable of meeting all of the ARR requirements.

Thus, this is an object of the present invention to provide a single sided control valve which is more user friendly.

Another object of the present invention is to provide a single sided control valve with the handle of the combined dirt collector and cut-out cock ready by accessible to the user and its position visible.

A further object of the present invention is to provide a single sided control valve which is capable of meeting the 30 inch from end of car requirement for the release rod valve in any and all situations.

A still further object of the invention is to provide a single sided control valve which is more stable in its mounting brackets.

These and other objects are achieved by providing the service portion mounted to the front face of a pipe bracket adjacent to the right face and emergency portion mounted to the front face adjacent to the left face. The brake pipe, brake cylinder and at least one reservoir port are on the back face and the brake pipe port is adjacent to the left face behind the emergency portion. A pair of brackets adjacent to the right and left faces mount the control valve to the vehicle. The mounting brackets each include a horizontal flange with apertures to receive the fasteners which mount the mounting brackets to the vehicle and the horizontal flange extends from the pipe bracket substantially past the front face. Thus, the horizontal flanges extend beyond the center of gravity of the control valve. Thus, the center of gravity is within the confines defined by the mounting brackets. This provides a more stable valve. Vertical flanges of the mounting bracket are mounted to a respective side face of the pipe bracket and horizontal flanges extend therefrom toward each other. This particular design of the pipe bracket and the mounting bracket can be mounted with the horizontal flanges adjacent either the top or bottom faces of the pipe bracket.

With the service portion mounted adjacent to the right face and the emergency portion mounted adjacent to the left face, the manual release of the service portion is between the service and the emergency portion. This displaces the release rod into substantially the center of the pipe bracket and therefore provides additional distance to the end of the car which is adjacent to the left side of the pipe bracket. A retaining valve is mounted to the front face of the pipe bracket above the release valve and between the service and the emergency portion. A cut-off cock or combined dirt collector and cut-off cock is connected to the brake pipe port adjacent to the left face of the pipe bracket and includes a handle to the left of the left face. This allows easy access of the handle without reaching under the pipe bracket and also provides visual indications of the position of the handle. Easy access is also provided to the dirt collector bowl. An air filter in the pipe bracket is behind the service portion. A brake pipe test port is also provided on the front face.

Generally, the back face will include ports for two reservoirs, namely an auxiliary reservoir and emergency reservoir.

Other objects, advantages and novel features of the present invention will become apparent from the following detailed description of the invention when considered in conjunction with the accompanying drawings.

DESCRIPTION OF PREFERRED EMBODIMENTS

Figure 1:
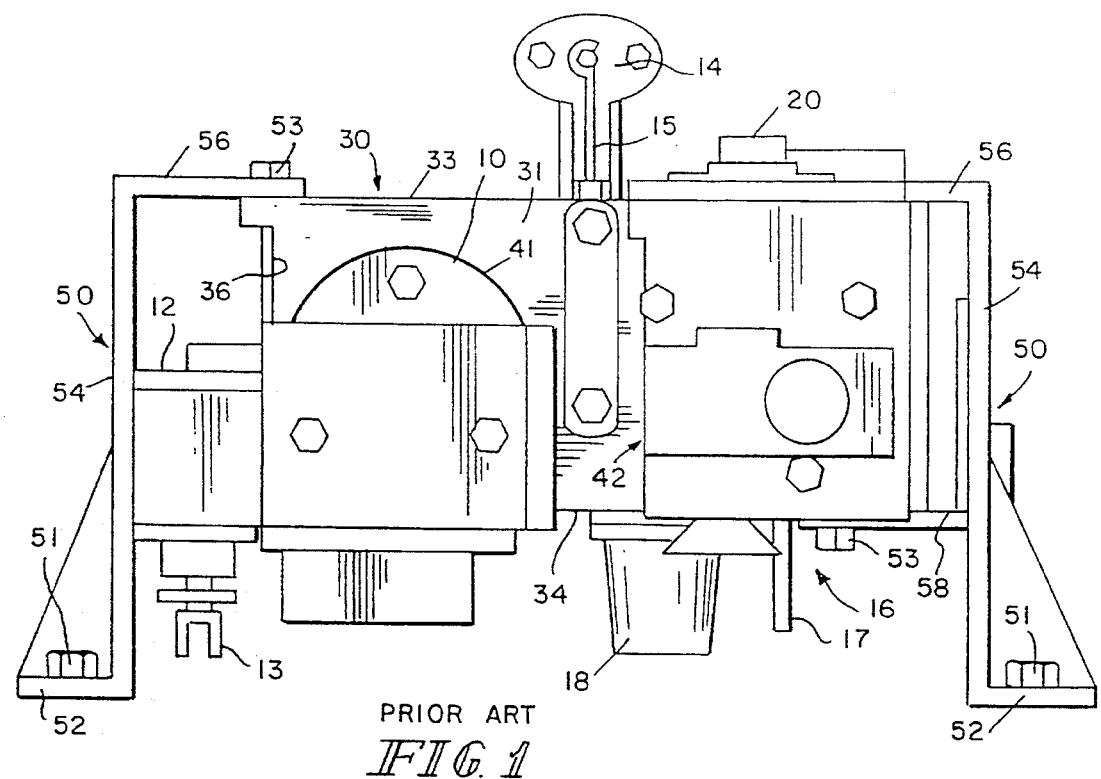
FIG. 1 is a front view of a single sided control valve of the prior art.
Figure 3:
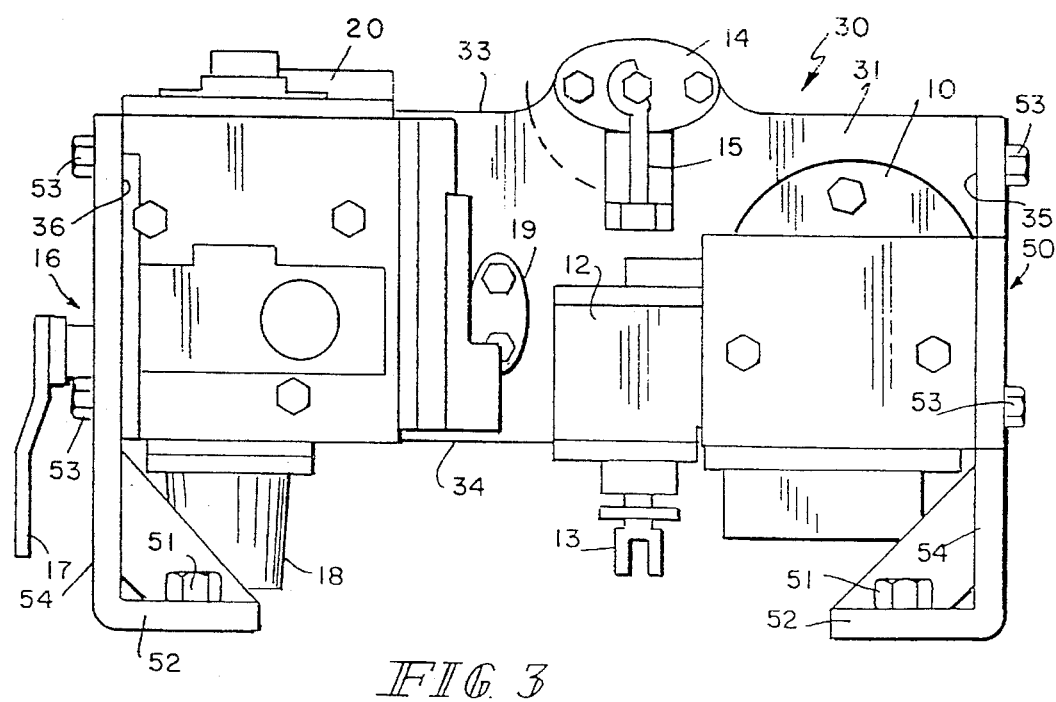
FIG. 3 is a front view of a single sided control valve incorporated in the principles of the present invention.
Figure 5:
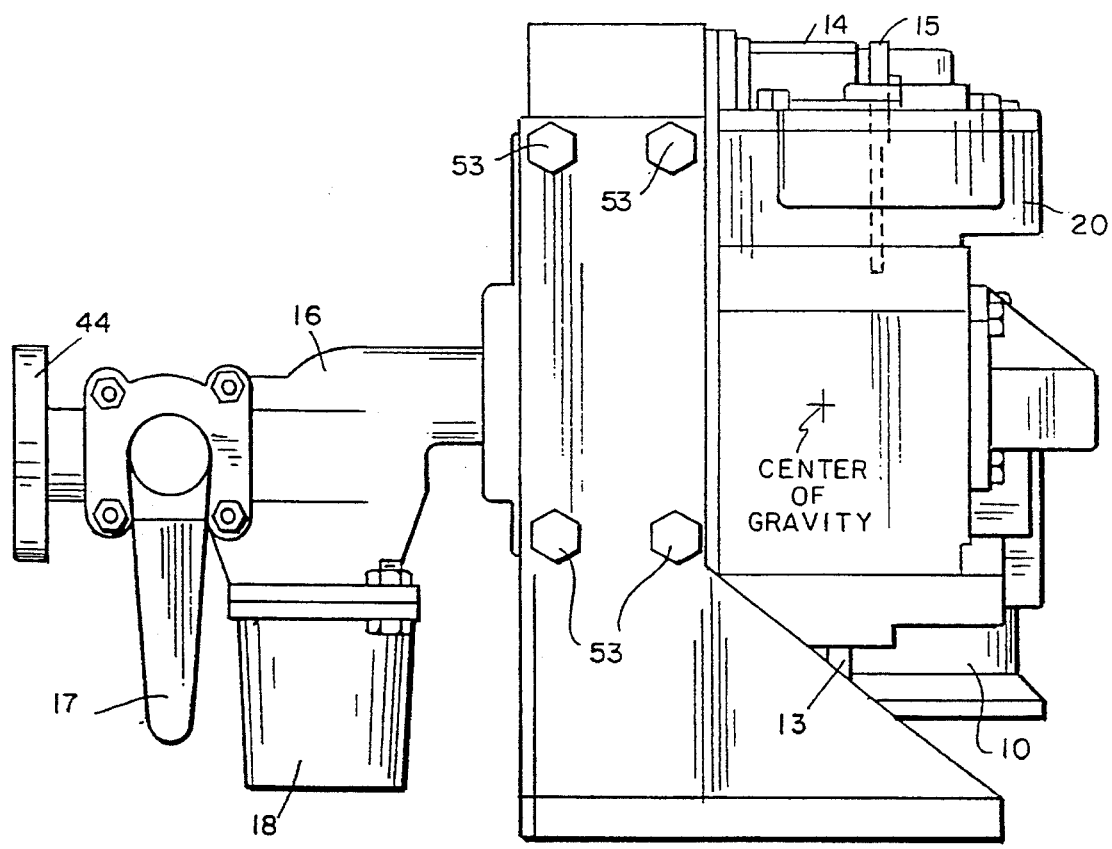
FIG. 5 is a left side view of a single sided brake control valve according to the principles of the present invention.
Figure 2:
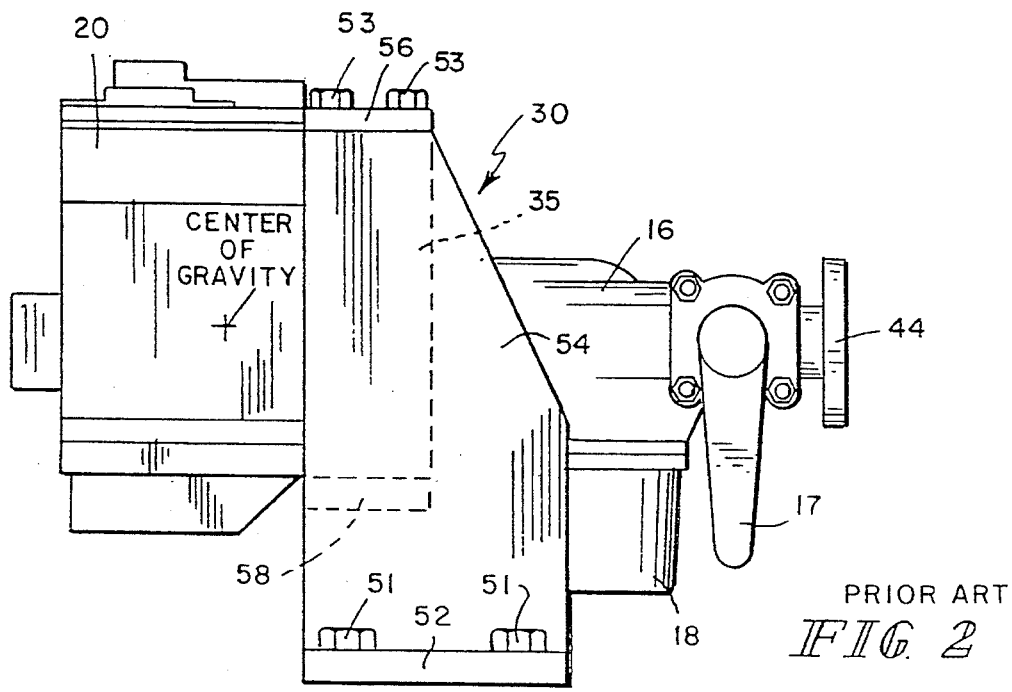
FIG. 2 is a schematic right side view of the prior art single sided control valve of FIG. 1.
Figure 4:
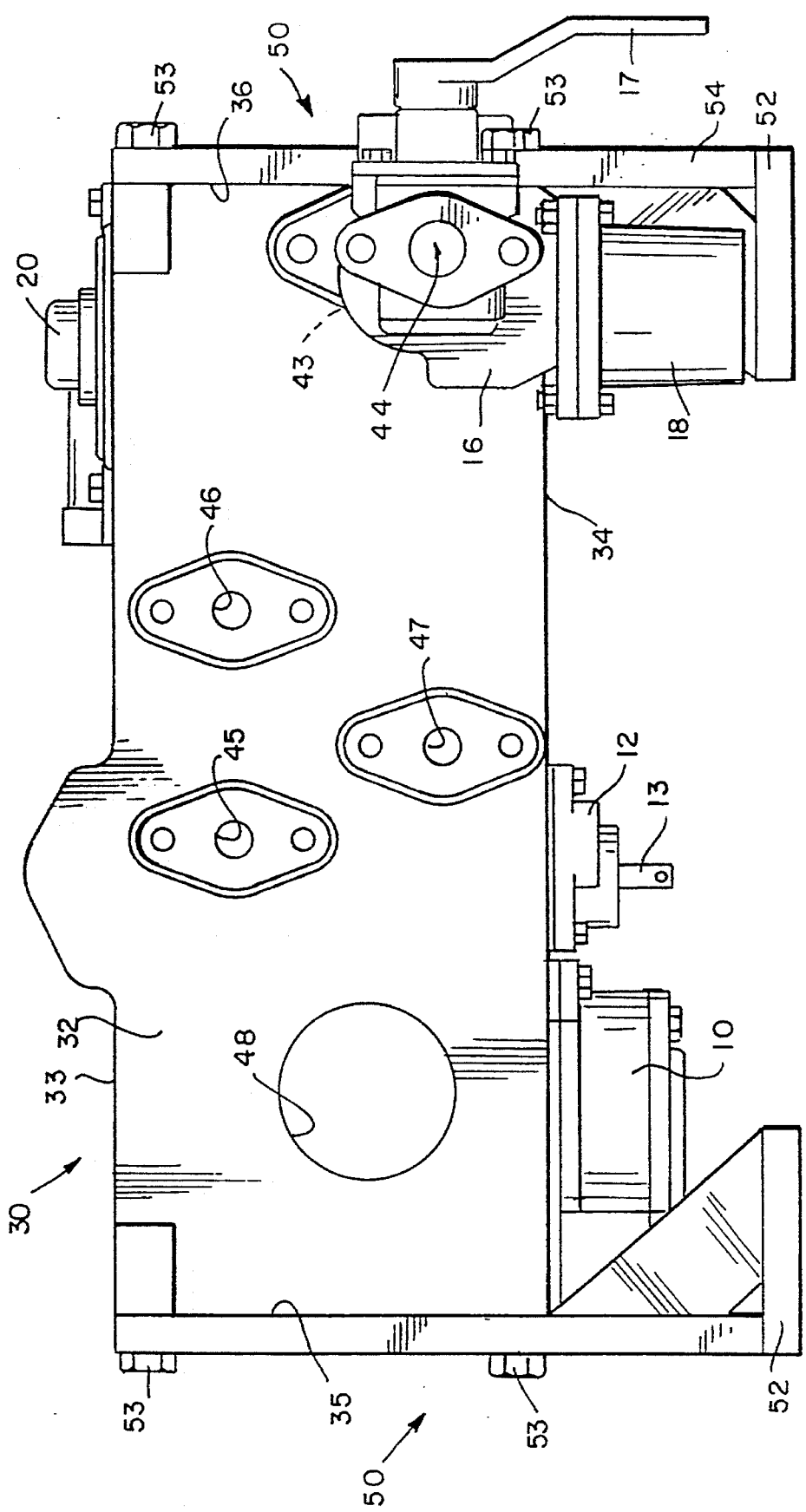
FIG. 4 is a back view of a single sided brake control valve according to the principles of the present invention.

A general overview of the prior art single sided valve is illustrated in FIG. 1 and 2 and will include the same reference numbers as that of the embodiment of the present invention illustrated in FIGS. 3–5 where they have the same function and purpose.

A control valve consists of generally three portions, namely, a service portion 10 and emergency portion 20 connected to a pipe bracket 30. The pipe bracket 30 connects the service portion 10 and the emergency portion 20 to the various types of a vehicle brake control system. The service portion 10 includes a manual release valve 12 having a release rod 13. It is this release rod 13 which must be a minimum of 30 inches from the end of the car. It should also be noted that in FIGS. 1 and 3, the end of the car is assumed to be on the left. Also connected to the pipe bracket 30 is a retaining valve 14 having a handle 15. A combined dirt collector and cut-off cock 16 is also connected to the pipe bracket and includes a handle 17 for the cut-off cock and a dirt collector bowl 18. The pipe bracket 30 includes a front face 31, back face 32, a top face 33, a bottom face 34, a right face 35 and a left face 36.

The service portion 10 is connected to service portion ports 41 in the face 31 and the emergency portion 20 is connected to emergency portion ports 42 also on the front face 31 of the pipe bracket. The service portion 10 and the emergency portion 20 or any standard service portion and emergency portion, for example ADB, ADBW, ABDX and DB-60. Porting on the face is well known. The rear face 32, illustrated in FIG. 4, includes a brake pipe port 43 to which the cut-off valve 16 is mounted and which includes its own brake pipe port 44. An auxiliary reservoir is connected to auxiliary reservoir port 45 and emergency reservoir is connected to emergency reservoir port 46. The brake cylinder is connected to brake cylinder port 47. An aperture 48 is provided in the back wall 32 to receive the filter. It should be noted that since FIG. 4 is a back view of a single sided brake control valve of the present invention, there is a variation of what the back view and porting would be for the single sided control valve of the prior art of FIGS. 1 and 2. Whereas the auxiliary reservoir port 45, the emergency reservoir pipe port 46, the brake cylinder port 47 and the aperture for the filter 48 are in the same position, and brake pipe port 43 and the cut-off valve 16 would be to the left of the brake cylinder port 47 in FIG. 4.

A mounting bracket mounts the pipe bracket 30 to the vehicle. The mounting bracket 50 includes a horizontal flange 52 and a vertical flange 54. Fasteners 51 connect the horizontal flange 52 to the body of the vehicle. In the prior art embodiment of FIG. 1 and 2, a second pair of horizontal flanges 56 and 58 extend from the vertical flange 54 and engage and are connected to the top surface 33 and the bottom face 34 of the bracket 30 by throughbolts 53. In FIGS. 1 and 2, the horizontal flanges 52 point away from each other and extend beyond the rear face 32 of the pipe bracket. The result, as shown in FIG. 2, is that the center of gravity of the control device is outside the confines of the brackets 50 and therefore the system is cantilever, producing undesirable stress and strain.

Another disadvantage of the prior art of FIG. 1 and 2 as discussed above, is that the handle 17 of the cut-off cock is only reachable by placing your hand underneath the bottom wall 34 and reaching to the rear, to move it up and down between its horizontal and vertical position. Also, there is no way to visually check the position of the valve since it is not visible from the front of the pipe bracket. Similarly, the position of the handle 17 furthest from the end of the car requires additional room for the maneuvering of the handle. It is difficult to remove and clean dirt collecting bowl 18.

Also, as previously discussed, by providing the emergency portion 20 over the filter opening 48, it is a violation of Field Manual 4, Item 4.

The retainer valve 14 is mounted to the back wall 32 by an adaptor which must extend above and over the top wall to allow the handle 15 to be accessible. This increases the overall height of the control valve.

A single sided control valve according to the principles of the present invention is illustrated in FIG. 3–5. The first difference to be noticed is that the service portion 30 is mounted to the front face 31 adjacent to the right face 35 and the emergency portion 20 is mounted to the face 31 adjacent the left face 36. This results in the placement of the manual release valve 12 of the service portion 10 and the release rod 13 between the service portion 10 and the emergency portion 20 and displaced from the left face 36. This displacement of approximately 12 inches makes the present valve more versatile and may be used with any size, body or shape car and still the meet the 30 inch displacement of the release rod 13 from the edge of the car (which is on the left of the FIG. 3). The other result of moving the emergency portion adjacent to the left face 36 and the service portion 10 adjacent the right face 35 is placing the service portion 10 over the filter opening 48. This brings the valve in compliance with Field Manual Rule 4, Item 4.

The retaining valve 14 is mounted to the front face 31 of the pipe bracket 30. This provides access to the handle 15 and reduces the height of the profile of the control valve. Also provided in the front face 31 of the pipe bracket is a brake cylinder test port 49.

Another major improvement of the present control valve is the positioning of the combined dirt collector and cut-off cock adjacent the left face 36 of the pipe bracket. As illustrated in FIG. 3 and 4, this allows the handle 17 to be to the left of the left side 36. This provides complete visual indication of the position of the handle 17 as well as access from or adjacent to the end of the car. Similarly positioning the dirt bowl 18 adjacent the end of the car allows easy access, removal and cleaning. Part of the advantage that comes about is the use of a combined dirt collector and cut-off cock where the handle 17 is mounted to the opposite side of the housing than that of the prior art device illustrated in FIG. 1. The specific design of the combined dirt collector and cut-out cock is shown in Design Application Ser. No. 29/025,855, filed Jul. 14, 1994.

A further modification between the control valve of the prior art of FIG. 1 and 2 and that of the present invention in FIGS. 3–5 is the design of mounting brackets 50. The horizontal flange 52 extend from the vertical flange 54 towards each other as illustrated in FIG. 3. They also extend from the pipe bracket past the front face 31 past the center of gravity of the control valve. The vertical flange 54 is mounted to the side walls 35 and 36 by bolts 53. This bracket structure provides an improved free standing, self-supporting system.

Another advantage of moving the manual release valve 12 in board is that it does not interfere with the positioning of the bracket 50. It also allows the lateral extent of the overall control valve to be reduced. As shown for the pipe bracket in FIG. 1, the brackets have to extend outside of the extension of the manual release valve beyond the lateral extent of the pipe bracket 30. It should also be noted that the present brackets 50 are capable of also mounting the present pipe bracket to be suspended from below a support. This is achieved by interchanging and inverting the right and left brackets. Thus, the horizontal flanges 52 would be above instead of below the pipe bracket. The prior art brackets 50 of FIGS. 1 and 2 are not capable of such a modification.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake control valve for operating a vehicles air brakes by controlling air pressure in a brake cylinder from at least one reservoir in response to brake pipe pressure in a brake pipe comprising:

a pipe bracket having opposed front and back faces, top and bottom faces and right and left side faces;

said rear face including brake pipe, brake cylinder and at least one reservoir ports and said brake pipe port being adjacent said left face;

a service braking portion mounted to said front face adjacent said right face;

an emergency braking portion mounted to said front face adjacent said left face; and a pair of mounting brackets adjacent said right and left faces for mounting said control valve to a vehicle.

2. A control valve according to claim 1 wherein said mounting brackets each include a horizontal flange with apertures for receiving fasteners which mount said mounting brackets to said vehicle and said horizontal flange extends from said pipe bracket substantially past said front face.

3. A control valve according to claim 2 wherein each of said horizontal flanges extends beyond the center of gravity of said control valve.

4. A control valve according to claim 2 wherein said mounting brackets each includes a vertical flange mounted to a respective side face and each of said horizontal flanges extends from said vertical flanges towards each other.

5. A control valve according to claim 2 wherein said mounting brackets can be mounted to said pipe bracket with each of said horizontal flanges adjacent either said top or bottom faces.

6. A control valve according to claim 1 wherein said service portion includes a manual release valve between said service portion and said emergency portion.

7. A control valve according to claim 6 including a retaining valve mounted to said front face above said release valve and between said service portion and said emergency portion.

8. A control valve according to claim 1 including a retaining valve mounted to said front face between said service portion and said emergency portion.

9. A control valve according to claim 1 including a cut-off cock connected to said brake pipe port and including a handle to the left of said left face.

10. A control valve according to claim 1 including a combined dirt collector and cut-off cock connected to said brake pipe port and including a handle to the left of said left face and said dirt collector adjacent said left face.

11. A control valve according to claim 1 including an air filter in said pipe bracket behind said service portion.

12. A control valve according to claim 1 including a brake cylinder test port on said front face.

13. A control valve according to claim 1 wherein said rear face includes two reservoir ports.

14. A pipe bracket for brake control valve for operating a vehicles air brakes by controlling air pressure in a brake cylinder from at least one reservoir in response to brake pipe pressure in a brake pipe, said pipe bracket comprising:

opposed front and back faces, top and bottom faces and right and left side faces;

said rear face including brake pipe, brake cylinder and at least one reservoir ports and said brake pipe port being adjacent said left face;

service braking portion ports on said front face adjacent said right face; and emergency braking portion ports on said front face adjacent said left face.

15. A pipe bracket according to claim 14 wherein said side faces each includes apertures for receiving fasteners for mounting a mounting brackets thereto.

16. A pipe bracket according to claim 14 including a retaining valve port in said front face above and between said service portion and said emergency portion ports.

17. A control valve according to claim 14 including an air filter passage in said pipe bracket behind said service portion ports.

18. A control valve according to claim 14 including a rear cylinder test port on said front face.

19. A control valve according to claim 14 wherein said rear face includes two reservoir ports.

\* \* \* \* \*